United States Patent [19]

Fontana

[11] 4,349,938
[45] Sep. 21, 1982

[54] CASTER ASSEMBLY WITH SWIVEL LOCK
[75] Inventor: Frank J. Fontana, Stratford, Conn.
[73] Assignee: Stewart-Warner Corporation, Chicago, Ill.
[21] Appl. No.: 196,282
[22] Filed: Oct. 14, 1980

Related U.S. Application Data
[63] Continuation-in-part of Ser. No. 167,680, Jul. 11, 1980.
[51] Int. Cl.³ ............................................. B60B 33/00
[52] U.S. Cl. .................................................. 16/35 R
[58] Field of Search ............. 16/35 R, 35 D; 188/1 D

[56] References Cited
U.S. PATENT DOCUMENTS

| | | | |
|---|---|---|---|
| 1,632,435 | 6/1927 | Darnell | 16/35 |
| 2,188,648 | 1/1940 | Bouvier et al. | 16/21 |
| 3,026,558 | 3/1962 | Mulholland | 16/35 R |
| 4,028,773 | 6/1977 | Morgan | 16/35 R |

Primary Examiner—Doris L. Troutman
Attorney, Agent, or Firm—Augustus G. Douvas

[57] ABSTRACT

A caster assembly of the type that accommodates swivelling movement of a caster wheel including a U-shaped horn that flanks the sides of the wheel and supports the wheel axle. A swivel plate is rotatably mounted on top of the horn and is adapted to be connected to the underside of the article to be supported. This plate carries a kingpin that extends through the horn and has an annular swivel lock plate fixed to its lower end. A swivel lock assembly is provided for locking the caster selectively in one of four 90 degree positions and it is mounted on rearwardly projecting ears on the U-shaped horn. The swivel lock assembly includes a spring biased axially movable plunger mounted radially with respect to the swivel lock plate and it is selectively engageable with four ninety degree spaced recesses in the swivel lock plate. The plunger is deactivated manually by pulling a ring extending through the rear end of the plunger against the biasing force of a coil spring and rotating the ring 90 degrees and releasing it into holding recesses on a U-shaped bracket fixed to horn ears.

4 Claims, 8 Drawing Figures

CASTER ASSEMBLY WITH SWIVEL LOCK

RELATED APPLICATION

This application is a continuation-in-part of my copending application entitled "Caster Assembly with Swivel Lock and Brake", Ser. No. 167,680, filed July 11, 1980.

BACKGROUND OF THE PRESENT INVENTION

Swivel lock assemblies have been provided for many years for casters that accommodate swivelling movement of the caster about a vertical pivotal axis. In one conventional form of caster, a swivel plate is pivotally mounted on top of the horn and this swivel plate is adapted to be fixed to the lower part of the article to be supported. Swivelling movement of the caster greatly increases the mobility and maneuverability of the supported article. It is frequently desirable to selectively prevent swivelling movement of the caster to assist in either completly or partly immobilizing the article supported. Various swivel lock assemblies have been provided in the past for this purpose, but they have been found to be not only expensive to manufacture, but also, to my knowledge, they have achieved swivel locking only in a semi-positive fashion that is not desirable in applications that require a high degree of reliability in immobilizing the supported article.

It is also frequently desirable to provide directional locking, i.e., all of the four casters supporting the article being oriented in the same angular position, so that the supported article is constained to move in only one linear direction.

It is the primary object of the present invention to ameliorate the problems noted above in swivel caster assemblies having swivel lock mechanisms.

SUMMARY OF THE PRESENT INVENTION

In accordance with the present invention, a swivel lock caster is provided with a simplified swivel lock assembly for positively locking the caster from swivelling motion and for orienting, if desired, all of the casters supporting an article in the same angular position to achieve straight line unidirectional motion. Toward this end, the present caster includes a generally U-shaped horn member carrying an axle that rotatably supports a wheel having an outer tread surface. A swivel plate is provided rotatably mounted in bearings on top of the horn, that is adapted to be connected to the article to be supported and effect the swivelling movement of the caster wheel.

The swivel plate, rotatably mounted on the horn, has a central "kingpin" that is welded to the plate and extends vertically through a central opening therein. This pin carries at its lower end beneath the horn, i.e., between the "bite" portion of the horn, an annular swivel lock plate that has four 90 degree spaced recesses about its outer periphery, and the swivel plate and swivel lock plate are locked together for rotation as a unit on the horn.

A swivel lock assembly is mounted on the horn engageable with the swivel lock plate to lock the swivel plate to the horn in four positions. The swivel lock assembly includes a U-shaped bracket mounted on top of rearwardly extending ears integral on the horn, that has a plunger tube welded to its upper surface disposed radially with respect to the swivel lock plate and vertically aligned therewith. A generally cylindrical stepped plunger is slidably received in the plunger tube and has a flat sided tang at its forward end that selectively fits into one of the four recesses on the swivel lock plate to positively lock the swivel plate to the horn. This plunger is biased to its locking position by a coil compression spring within the plunger tube, and it is held in an inactive position by a manual finger ring that extends through the rear end of the plunger that is rotated 90 degrees upon withdrawal of the plunger and released into holding recesses in the rear end of a U-shaped bracket fixed to the outer end of the plunger tube and the horn ears.

With this swivel lock assembly, if all four casters beneath the supported article are locked in the same angular position, (which is quite simple because of the 90 degree related recesses in the lock plate), the supported article may be constrained for movement in either of two perpendicular paths. This is desirable where the equipment is positioned adjacent other equipment and it must be shifted frequently without contacting the adjacent equipment. Free swivelling casters frequently cause somewhat erratic movement of the supported equipment from one side to another along its desired path of travel.

Moreover, the wheels of the present caster, with the swivel lock assembly, may each be locked in different angular positions to substantially completely immobilize the supported article.

DETAILED DESCRIPTION OF THE PREFERRED EMBODIMENT

Figure 1:
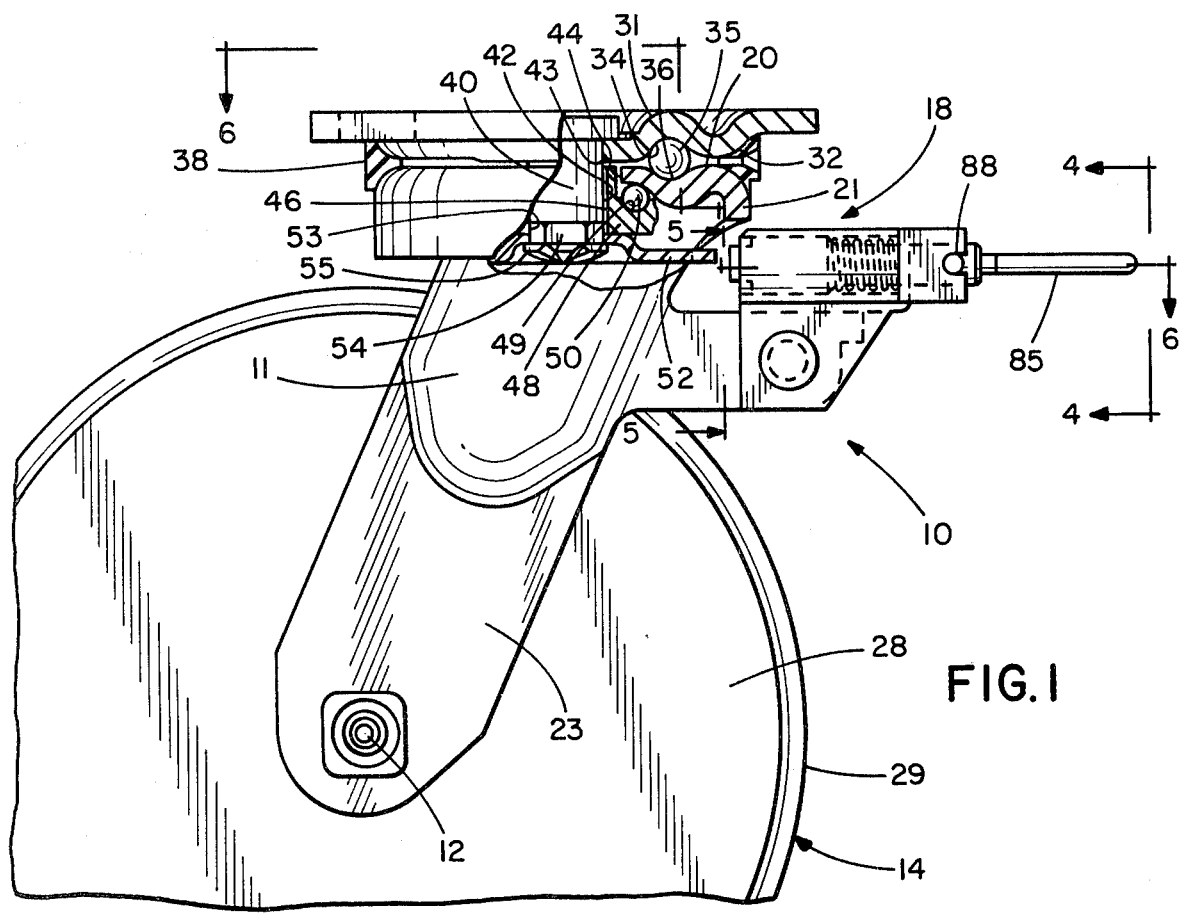
FIG. 1 is a partly fragmentary side view of the present caster with swivel lock assembly.
Figure 2:
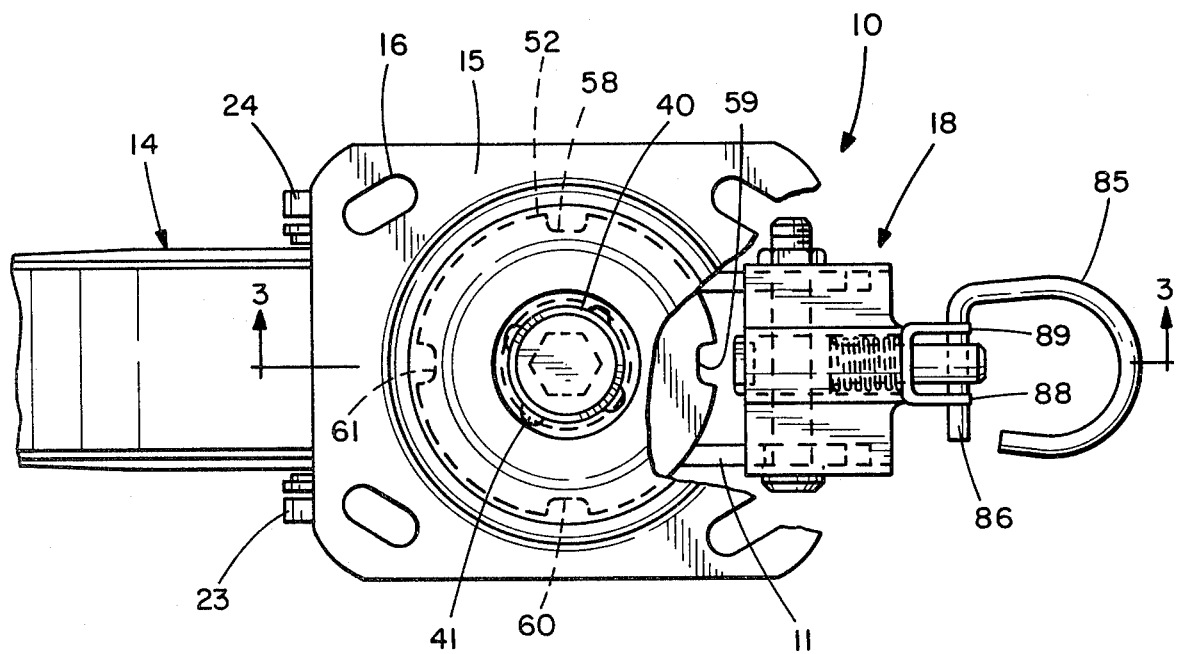
FIG. 2 is a partly broken away top view of the caster illustrated in FIG. 1, illustrating the swivel lock in a deactivated position.

Referring to the drawings, particularly FIGS. 1 and 2, the present swivel caster 10 is illustrated consisting generally of a U-shaped horn member 11 carrying an axle 12 that supports a wheel 14 for rotation with the horn carrying a freely rotatable rectangular swivel plate 15 on its upper surface. Swivel plate 15 has a plurality of apertures 16 therethrough adapted to receive fasteners to connect the swivel plate 15 to the article to be supported. With the swivel plate 15 fixed to the supported article, the horn and the wheel 14 are free to pivot about a vertical axis with respect to the swivel plate to increase the maneuverability of the article supported by a plurality, usually four, of the caster assemblies 10.

A swivel lock assembly 18 is provided for locking the horn 11 directionally in one of four 90 degree positions with respect to the swivel plate 15 and the supported article, and hence when all casters are locked in the same position, movement of the supported article is limited to one of two ninety degree linear paths.

As seen in FIGS. 1, 2, 3, 6 and 7, the horn 11, preferably constructed of a ferrous metal, has a top surface 20 with an annular depending flange 21 connected to spaced parallel side legs 23 and 24. The lower ends of the legs 23 and 24 have apertures that receive axle 12 in position by threaded nuts.

Wheel 14 is rotatably mounted on axle 12 and includes a metal hub member 28 with an outer tread 29 of a somewhat resilient plastic material, such as nylon, molded directly on the periphery thereof.

The swivel plate 15 is a rectangular member also constructed of a ferrous material, but it should be understood that it may as well be circular in outer configuration. The swivel plate 15 has stamped opposed semitoroidal ridges 31 and 32 that together define a toroidal recess 34 that forms one race for a plurality of ball bearings 35, also seated in a stamped semi-toroidal mating recess 36, disposed centrally in the top 20 of the horn 11.

The space between the swivel plate 15 and the top 20 of the horn is sealed and lubricated by a plastic seal and lube ring 38 described in detail in my co-pending application entitled "Swivel Type Caster with Seal and Lubrication Ring", Ser. No. 161,861, filed June 23, 1980, and assigned to the assignee of the present invention.

The swivel plate 15 is axially fixed to the horn by a "kingpin" 40 that is welded at its upper end to the upper surface of the swivel plate 15 by weldments 41. Pin 40 has a shank portion 42 that extends through a central aperture 43 in swivel plate 15, freely through a central opening 44 in the horn top 20, and through a central opening 46 in an annular thrust member 48. Thrust member 48 has a semi-toroidal recess 49 in its upper surface that receives ball bearings 50 that engage the lower surface of the horn top 20 to axially lock, with bearings 35, the swivel plate 15 to the horn top 20 in both vertical directions while permitting free rotational movement therebetween.

The lower end of the kingpin 40 carries an annular swivel lock plate 52 that forms part of the swivel lock assembly 18. Plate 52 has a hexagonal central opening 53 that is snugly seated on a complementary lower end 54 of the pin 40, preventing rotation of the lock plate 52 with respect to swivel plate 15. The lower end of pin 40 is swaged as shown at 55 to stake the lock plate 52, the thrust member 48 and the swivel plate 15 as a unit on the top 20 of the caster horn 11.

As seen in FIG. 2, the swivel plate 52 has four peripheral recesses 58, 59, 60 and 61 spaced 90 degrees from one another about the periphery of the plate 52. The recesses 58, 59, 60 and 61 are oriented with respect to the swivel plate 15 and the fastener receiving openings 16, such that the recesses 59, 61 will be parallel to one axis of the supported equipment and the recesses 58, 60 will be parallel to the transverse axis of the supported equipment.

As seen in FIGS. 3 to 6, the horn legs 23 and 24 have forwardly horizontally projecting ears 63 and 64 that carry a U-shaped frame bracket 65 having a flat top portion 66 and depending side legs 67 and 68, flanking the outside of ears 63 and 64 and fastened thereto by a threaded fastener member 70. An annular plunger tube 71 is welded to the upper surface of bracket portion 66 by weldments 73 indicated in FIG. 5. Tube 71 is disposed radially with respect to the axis of swivel lock plate 52 and is vertically aligned therewith.

A one-piece plunger 75 is slidable and rotatable in plunger tube 71 and has an annular enlarged portion 76 slidably engaging the inner wall of tube 71, a forwardly extending tang portion 78 having flat sides 79 and 80 spaced apart slightly less than the width of the recesses 58, 59, 60 and 61, and a reduced rear stem portion 82. The reduced rear stem portion 82 extends through an opening in a U-shaped bracket 84 welded to the rear end, or outer end, of tube 71 and ears 63 and 64 and carries a finger ring 85 having a straight transverse portion 86 press-fitted within a bore 87 adjacent the end of plunger stem 82. Horizontally aligned recesses 88 and 89 are formed in the outwardly extending legs of the U-shaped bracket 44.

Figure 3:
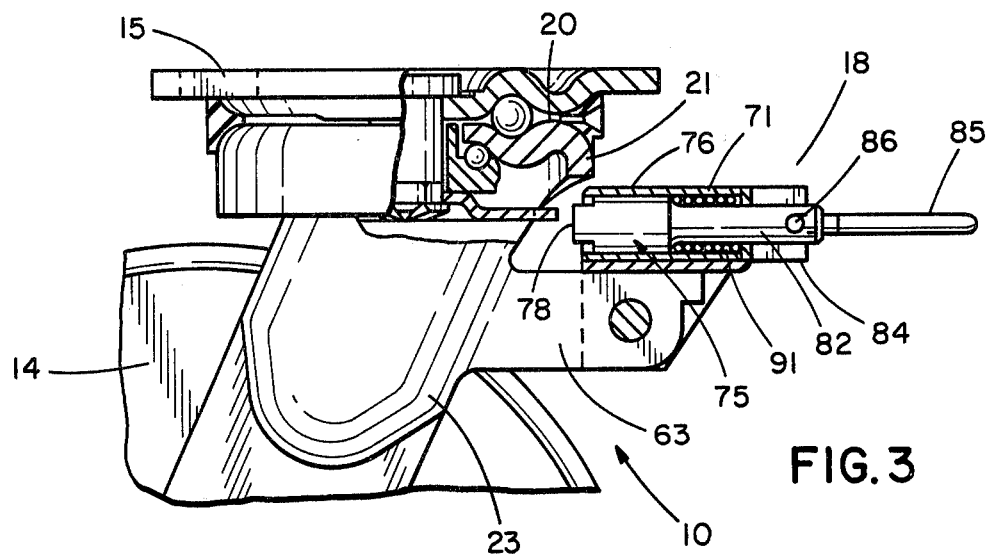
FIG. 3 is a cross-section of the swivel plate and swivel lock assembly taken generally along line 3—3 of FIG. 2.
Figure 4:
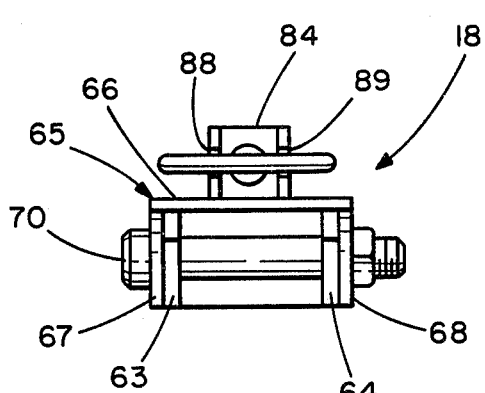
FIG. 4 is a front view of the swivel lock assembly taken generally along line 4—4 of FIG. 1.
Figure 5:
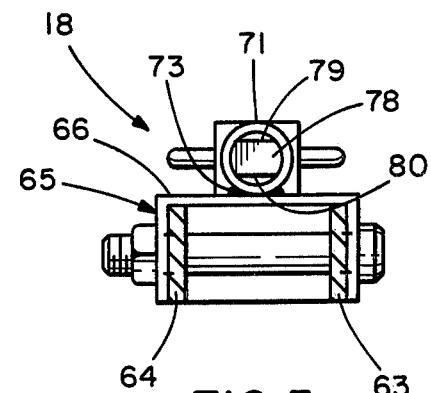
FIG. 5 is a cross-section of the swivel lock assembly taken generally along line 5—5 of FIG. 1.
Figure 6:
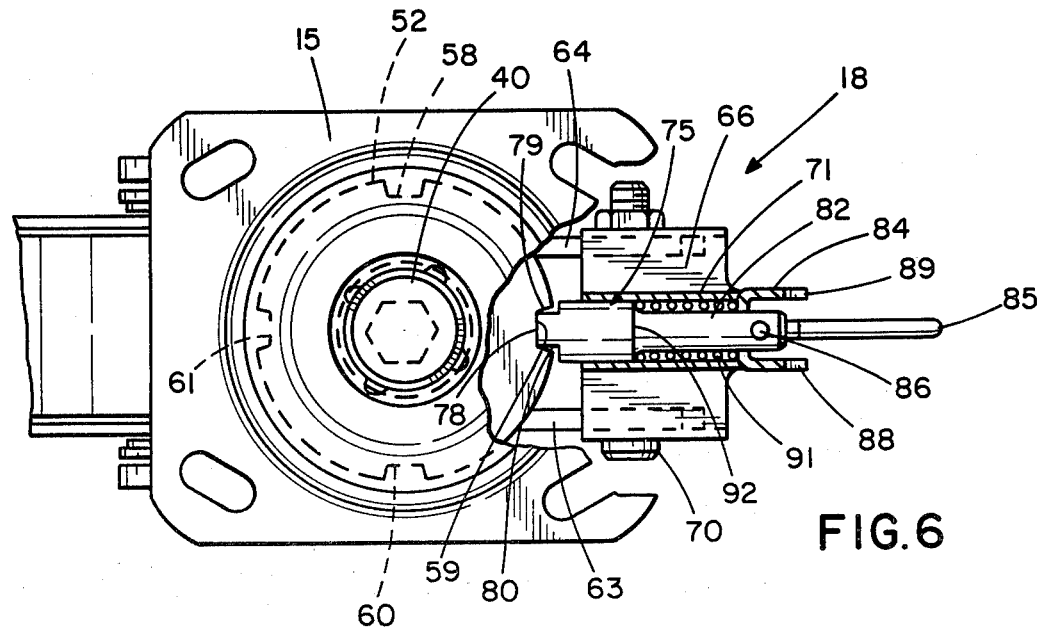
FIG. 6 is a top view of the caster assembly generally similar to FIG. 2 with the plunger tube illustrated in cross-section, illustrating the swivel lock in an activated position.

A coil compression spring 91 is seated within plunger tube 71 reacting at its right end (as seen in FIGS. 3 and 6) against bracket 84 and engaging a shoulder 92 on the enlarged plunger portion 76 to urge the plunger and tang 78 toward the swivel lock plate 52.

The swivel lock assembly 18 is shown in its inactive or unlocked position in FIGS. 3 and 6. In this position, coil spring 91 is compressed, with the plunger 75 withdrawn and the lock ring 85 in a horizontal position with straight lock ring transverse portion 86 fitted within the recesses 88 and 89 in holding bracket 84. Thus bracket 84 holds the plunger 75 in its inactive position.

Figure 8:
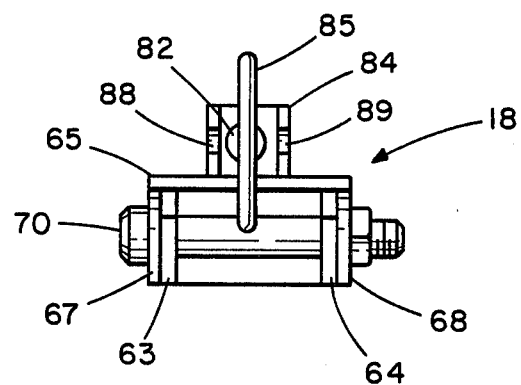
FIG. 8 is a front view taken along line 8—8 of FIG. 7, similar to the front view of FIG. 4, with the swivel lock assembly illustrated in its locking position.

To lock the horn and caster wheel in position, the horn and wheel are initially rotated approximately to the desired one of four 90 degree positions and the ring 85 is pulled outwardly and rotated 90 degrees to the position shown in FIG. 8, clearing the transverse portion of ring 85 from the legs of the bracket 84 and its recesses 88 and 89. The ring 85 is then released permitting spring 91 to shift the plunger 75 and tang 78 against the locking plate 52. At this time it may or may not be necessary to shift the caster wheel 14 and horn 11 slightly to permit the tang 78 to snap in the nearest one of the locking plate recesses 58, 59, 60 and 61.

To release the swivel lock assembly 18, the ring 85 is withdrawn compressing spring 91 and rotated 90 degrees after transverse ring portion 86 clears the end of the bracket 84 and then the ring is released permitting transverse ring portion 86 to fit into bracket recesses 88 and 89 as shown in FIGS. 1 and 2.

Figure 7:
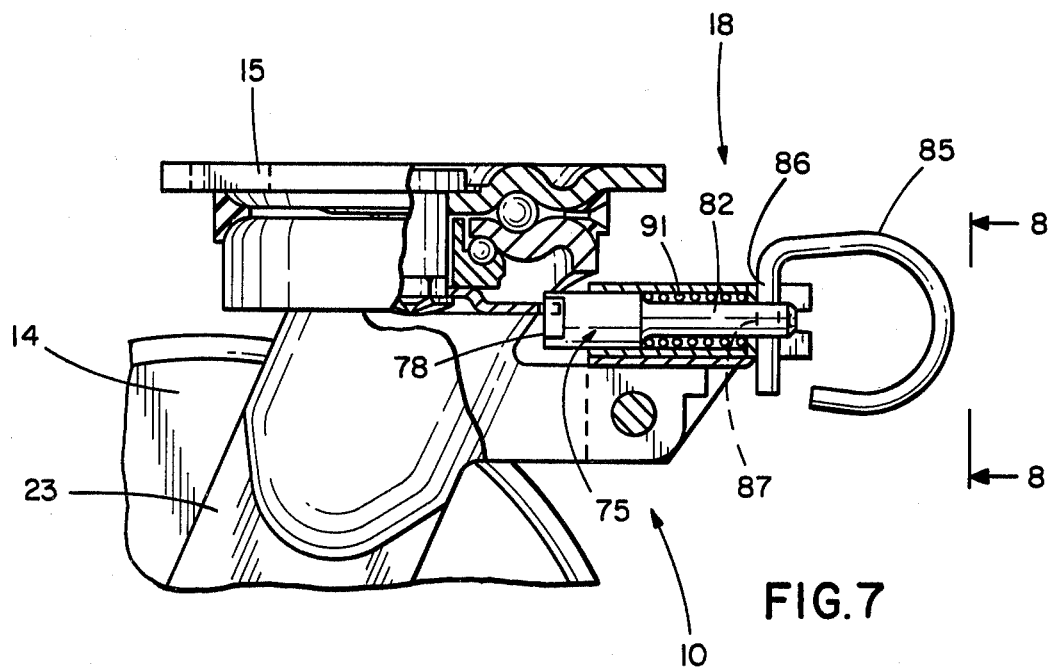
FIG. 7 is a fragmentary section generally similar to FIG. 3 with the swivel lock assembly in its locking position.

If all four caster assemblies under the supported article are, for example, locked in the same recess 59 in the lock plate 52 the supported article will be constrained for linear forward movement to the right in FIGS. 1, 3 and 7, or rearward movement to the left in a straight accurate path. By rotating all of the casters 90 degrees and locking the swivel lock assembly in one of the recesses 58, 60, the supported article will be constrained for linear movement in a transverse path. In some cases, it may be desirable to lock the casters in different positions to substantially completely immobilize the supported equipment.

What is claimed:
1. A caster assembly, comprising; a horn member, an axle mounted in said horn means, a wheel supported for rotation on said axle, a swivel plate mounted on said horn means for pivotal movement about an axis generally transverse to the axis of the axle, said swivel plate having at least one recess in the periphery thereof, a swivel lock member mounted on the horn member for reciprocating movement, said swivel lock member including a plunger having a projection selectively engageable with the recess in the periphery of the swivel plate, an actuator for withdrawing the plunger from the swivel plate and holding it in an active position, the plunger being pivotally mounted in the horn member and axially movable from an active position in engagement with the swivel lock plate to an inactive position pivoted 90 degrees with respect to the active position thereof, a transverse actuator member carried by the outer end of the plunger, and a U-shaped holding bracket on the horn member having spaced recesses in the ends thereof for receiving the transverse member and holding the plunger in its inactive position.

2. A caster assembly, comprising; a horn member, an axle mounted in said horn means, a wheel supported for rotation on said axle, a swivel plate mounted on said horn means for pivotal movement about an axis generally transverse to the axis of the axle, said swivel plate having at least one recess in the periphery thereof, a swivel lock member mounted on the horn member for reciprocating movement, said swivel lock member including a plunger having a projection selectively engageable with the recess in a periphery of the swivel plate, an actuator for withdrawing the plunger from the swivel plate and holding it in an active position, a plunger tube fixed to the horn member, said plunger being reciprocal and rotatable in the plunger tube, a U-shaped holding bracket having recesses in the ends of the legs thereof fixed to the outwardly extending ends of the plunger tube, a spring in the plunger tube reacting against the bracket and the plunger to urge the plunger toward engagement with the swivel lock plate, said plunger being pivotal and axially movable in the plunger tube from an active position in engagement with the swivel lock plate to an inactive position in engagement with the swivel lock plate to an inactive position axially moved from and rotated 90 degrees with respect thereto, and a transverse member carried by the outer end of the plunger engageable with the recesses in the holding bracket to hold the plunger in its inactive position.

3. A caster assembly, comprising; a horn member, an axle mounted in the horn member, a wheel mounted on the axle for rotation, a swivel member mounted on the horn member for pivotal movement about an axis generally transverse to the axis of the axle, said swivel member including a swivel lock plate having only four locking recesses therein spaced 90 degrees about the periphery thereof, a plunger axially reciprocable in the horn member for selectively engaging the recesses in the swivel lock plate to lock the swivel lock plate with respect to the horn member so that the supported article may only move in one of two perpendicular linear paths, said plunger being movable on an axis perpendicular to the axis of the swivel plate, the horn member including a pair of outwardly projecting ears, a plunger support bracket fixed to the ears, a plunger tube fixed to the top of the plunger support bracket and slidably receiving the plunger, said plunger tube being mounted radially with respect to the axis of the swivel member, said plunger being reciprocably and rotatably mounted in the plunger tube, a holding bracket having spaced recesses therein fixed to the end of the plunger tube, and a transverse actuator rod carried by the outer end of the plunger to rotate the plunger and shift it axially from an active position in engagement with the swivel lock plate to an inactive position where the transverse member is held in the holding bracket recesses.

4. A caster assembly, comprising; a generally U-shaped horn member having a top surface and depending side legs, an axle carried by the depending side legs rotatably supporting a wheel between the side legs, said horn member having spaced projecting integral ears, a swivel member mounted on the top of the horn member for rotational movement and having a central pin projecting vertically downwardly through the horn member, said pin having a swivel lock plate rotatably fixed to the lower end thereof so that the swivel member and lock plate move together as a unit on the horn member, said swivel lock plate having only four 90 degree related recesses in the periphery thereof, a U-shaped mounting bracket fixed to the projecting ears on the horn member, a plunger tube fixed to the top of the bracket and radially aligned with respect to the swivel plate, a plunger reciprocably and rotatably mounted within the plunger tube and having a flat sided tang at the radially inner end thereof selectively engageable in the recesses in the swivel lock plate, a U-shaped holding bracket fixed adjacent the radially outer end of the plunger tube and having spaced aligned outwardly opening recesses therein, said plunger having an outer end projecting through the U-shaped bracket, and an actuating ring carried by the outer end of the plunger that has a portion receivable in the recesses in the holding bracket to position the plunger in an inactive position away from the swivel lock plate.

* * * * *